Aug. 20, 1968  B. J. ALDENHOFF  3,398,255
HIGH SPEED PULSE WELDING
Filed Jan. 8, 1964
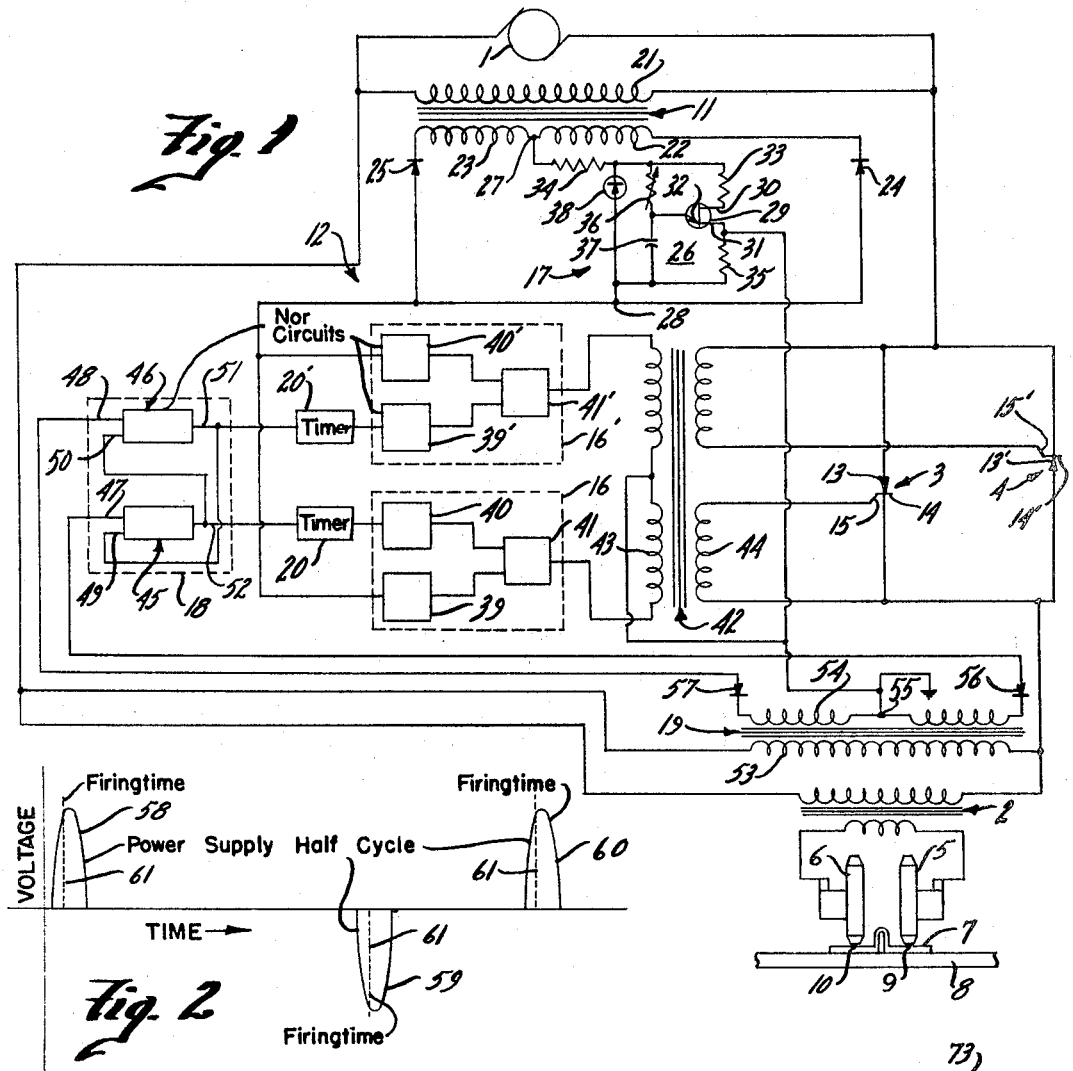
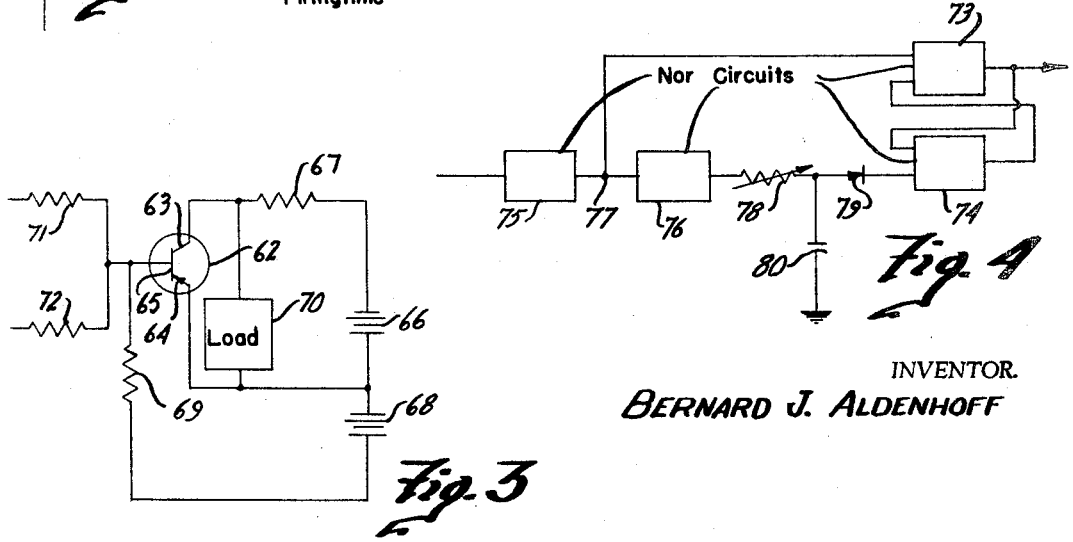
INVENTOR.
BERNARD J. ALDENHOFF United States Patent Office 3,398,255
Patented Aug. 20, 1968

3,398,255
HIGH SPEED PULSE WELDING
Bernard J. Aldenhoff, Oconomowoc, Wis., assignor, by mesne assignments, to Harnischfeger Corporation, West Milwaukee, Wis., a corporation of Wisconsin
Filed Jan. 8, 1964, Ser. No. 336,484
10 Claims. (Cl. 219—108)

ABSTRACT OF THE DISCLOSURE

A high frequency alternating current source having a frequency of at least 1000 cycles per second is connected in a series with a pair of paralleled rectifiers of opposite polarity alternately conducting the negative and positive half cycles of the current to a resistance seam welder. A unijunction pulse generator creates a train of sharp pulses in synchronism with the output of the high frequency generator. An "and" logic circuit has the train of pulses from the generator connected as one input. A flip-flop circuit is connected across the seam welder to provide a feedback pulse signal which is connected to the second input of the "and" logic circuit to conjointly control creation of a trigger pulse to the rectifiers. The feedback signal is fed through an adjustable timer to make one or more of the main pulses ineffective.

The pulses from the main pulse generator are phase controlled such that the point in the cycle of the welding current at which the corresponding rectifier is fired and is controlled to vary the power input to seam welder.

---

This invention relates to high speed pulse welding and more particularly to an electric circuit for supplying a series of short duration current pulses of a relatively high amperage to welding electrodes from a high frequency alternating potential source.

In certain welding processes, heat penetration into the workpieces must be minimized during welding to prevent damage to the work. For example, in interconnecting relatively thin metal members by spot welds from the back side, heat penetration must be minimized to avoid affecting the front surface which may have a plastic or other decorative coating.

Generally, past pulse welding supplies, particularly for resistance welding, have employed a stored energy system wherein a capacitor is charged by an alternating current source and then rapidly discharged into the welding electrodes, most generally through a welding transformer. For example, recently issued Patent 3,086,-158 to T. R. Thompson discloses a pulse producing circuit having an alternating current source of the standard sixty cycle frequency charging a capacitor which is discharged through a thyratron control unit into a welding transformer.

Such stored energy units are not particularly adapted to rapid production where a substantial number of closely spaced spot welds are to be made to form a seam weld, because of the maximum impulse rate which is substantially limited by the recharging time required by the capacitor bank.

The present invention is particularly directed to a high speed spot welder which may be employed as a seam welder by the provision of continuous spot welds. Generally, in accordance with the present invention, a high frequency alternating current source having a frequency of at least 1000 cycles per second is connected in a series with high speed triggering devices such as silicon controlled rectifiers or other similar high speed solid state electronic units having a gate electrode for triggering of the rectifier to a conducting state. The power source is preferably connected to a pair of paralleled rectifiers of oposite polarity alternately conducting the negative and positive half cycles of the current. The silicon controlled rectifiers normally prevent transfer of the current from the source to the welding electrodes. In accordance with the present invention, a pulse generating means creates a train of sharp pulses in synchronism with the output of the high frequency generator. A logic circuit has the train of pulses from the pulse generating means connected as one input and a time controlled pulse generated as a result of a feedback signal as a second input to conjointly control creation of a trigger pulse to the rectifiers. The feedback signal is fed through a time delay device into the logic circuit and may make one or more of the main pulses ineffective. The time delay device is adjustable for varying or presetting which of the pulses in the main pulse train is effective to trigger the associated rectifier.

Further, in accordance with another aspect of the present invention, the pulses from the main pulse generator are phase controlled such that the point in the cycle of the welding current at which the corresponding rectifier is fired is controlled to vary the power input to the electrodes.

The present invention provides a high speed pulse welding system particularly adapted for resistance welding wherein the power of the pulse is readily controlled and the pulses can be separated by any preset number of cycles.

The drawing furnished herewith illustrates the best mode presently contemplated for carrying out the invention and clearly discloses and illustrates the structure, function and advantages of the present invention.

In the drawing:

FIG. 1 is a diagrammatic illustration of a welding supply system incorporating the circuitry of the present invention;

FIG. 2 is a typical graphic illustration of three welding current pulses for a circuit constructed in accordance with this invention;

FIG. 3 is a schematic circuit diagram of a component shown in FIG. 1; and

FIG. 4 is a diagrammatic illustration of a timer circuit shown in block diagram in FIG. 1.

Referring to the drawings and particularly to FIG. 1, the illustrated welding system includes a high frequency alternating current source 1 which is conected to supply power to a welding transformer 2 through a pair of parallel connected silicon controlled rectifiers 3 and 4. The alternating current source 1 produces any high frequency output in excess of 1000 cycles per second. The silicon controlled rectifiers 3 and 4 as hereinafter described normally block current flow from the source to the welding transformer 2. However, when they are fired into a conductive state, they will allow the corresponding half cycle to flow. By alternately firing rectifiers 3 and 4, 2000 or more pulses per second can be supplied to the welding transformer 2.

The output of the welding transformer 2 is connected across a pair of seam welder wheels 5 and 6 which are rotatively journaled for simultaneous rotating movement along a metal sheet 7 which is to be welded to a base or underlying metal sheet 8. As shown, sheets 7 and 8 are relatively thin metal members and when a pulse of current from source 1 energizes transformer 2, current flows between wheels 5 and 6 and through the metal sheets 7 and 8 creating resistance welds 9 and 10 in alignment with the respective electrode wheels 5 and 6. By proper triggering of the silicon controlled rectifiers 3 and 4 and correlating the relative speed of the electrodes 5 and 6, a predetermined series of spot welds can be provided. A 1000 cycle current source 1 may provide approximately 2000 pulses per second. Consequently, the electrodes 5 and 6 can be moved at a very high rate with respect to the work 7 while maintaining closely adjacent and practically overlapping spot welds. As a result, a continuous seam weld may be produced at a very high rate.

A control input transformer 11 is connected to the output of the alternating current source 1 and connected to control a controlled firing circuit 12 for preselected firing of the silicon controlled rectifiers 3 and 4. The output of the firing circuit 12 is connected to control the alternate firing of the silicon control rectifiers 3 and 4 thereby controlling the power pulses to the electrodes 5 and 6.

Each of the silicon controlled rectifiers 3 and 4 are similarly connected and controlled through generally paralleled and alternately active channels. The silicon control rectifier 3 is described in detail hereinafter and with corresponding elements relating to the silicon control rectifier 4 being similarly numbered with a superscript prime added to distinguish between the elements of the two rectifiers.

Generally, the illustrated silicon control rectifier 3 may be the well known type having an anode electrode 13, a cathode electrode 14 and a gate electrode 15. The anode electrode 13 is connected to the one side of the source 1 and the cathode electrode 14 is connected to the one side of the welding transformer 2. The opposite side of the transformer 2 is connected directly to the alternating current source 1. The silicon control rectifier 3 is of such character that it will conduct between the electrodes 13 and 14 in only the one direction when the alternating potential is of the proper polarity; the connection shown requiring the right side of the source 1 to be positive. Further, the silicon control rectifier 3 only conducts current between electrodes 13 and 14 when a signal is applied to gate 15 to fire or trigger the rectifier 3 into a conducting state. Thereafter, the rectifier continues to conduct even though the signal at the gate 15 is removed.

The silicon control rectifier 4 is similarly constructed but is connected with an opposite polarity; that is, with the anode electrode 13' connected to the transformer 2 and the cathode electrode 14' connected to the source 1. The silicon control rectifier 4 therefore conducts during the opposite half cycle from that of the silicon control rectifier 3 if a proper input signal is simultaneously applied to the gate electrode 15'.

The gate electrodes 15 and 15' are provided with firing signals from circuit 12 as hereinafter described.

Generally, the illustrated control or firing circuit 12 includes "AND" logic circuits 16 and 16' each having a pair of inputs fed respectively from a common trigger pulse generator 17 and an output responsive impulse generator 18 which is connected to a transformer 19 to the output side of rectifiers 3 and 4. The latter is connected to the logic circuit 16 by an adjustable timer 20 to allow controlled transmission of a pulse from generator 18.

Generally, the operation of the illustrated circuit can be summarized as follows. The silicon control rectifiers 3 and 4 normally block current flow to the welding transformer 2 and therefore to the electrodes 5 and 6. The pulse generator 17 is connected to the high frequency source 1 and is adapted to establish a train of pulses in synchronism with the half cycles of the current source 1; that is, a pulse is generated for each half cycle of the alternating potential of the source 1. These pulses are simultaneously fed to the "AND" logic circuits 16 and 16' and condition the circuits to establish an output from the corresponding circuit to fire the silicon control rectifiers. However, the logic circuits 16 and 16' will only establish a firing output signal when a signal is simultaneously applied from generating means or generators 17 and 18. Generator 18 establishes an initial pulse at random or through a suitable control means which actuates the timer 20 or 20'; for purposes of discussion assumed to be timer 20. After a predetermined delay, timer 20 transmits a signal to the "AND" logic circuit 16. When the next pulse from generator 17 is applied to circuit 16, the latter tansmits a firing signal which is applied to the associated silicon control rectifier 3 which fires and conducts. A positive pulse is then fed to transformer 2 and the electrodes 5 and 6 during the positive half cycle of the alternating current source 1. Simultaneously, this welding pulse is fed back through the feedback transformer 19 and to pulse generator 18 and actuates it to transmit a signal to timer 20' and therefrom to the logic circuit 16'. This in turn establishes a firing signal to the silicon control rectifier 4 and the negative half cycle is transmitted to the welding transformer 2 and the feedback transformer 19. The signal from transformer 19 reverses the output of generator 18 to again condition circuit 16. This action continues with the silicon control rectifiers 3 and 4 being alternately fired until the alternating power source 1 is shut off in any suitable means.

The pulse generators and the logic circuits are formed of conventional devices interconnected to provide a new and novel welding circuit as follows.

The trigger pulse generators 17 include the signal input transformer 11 having a primary 21 connected directly across the alternating current source 1. A center tapped secondary having series connected portions 22 and 23 is provided having reverse polarity connected diodes 24 and 25 connected in series across the secondary. A pulse forming circuit 26 is connected between the secondary center tap 27 and a junction 28 of diodes 24 and 25. The pulse forming circuit 26 includes a unijunction transistor 29 having a pair of base electrodes 30 and 31 and an emitter electrode 32 connected in accordance with known construction. The load electrode 30 is connected in series with a pair of resistors 33 and 34 to the center tap 27 and the electrode 31 is connected in a series with a resistor 35 to the junction 28 of diodes 24 and 25. A variable resistor 36 in series with a capacitor 37 is connected across the series circuit of resistor 33, transistor 29, and resistor 35. Additionally, a Zener diode 38 is connected across the above parallel circuits to maintain a maximum constant voltage for charging capacitor 37.

The diodes 24 and 25 function to provide a full wave rectified current to the parallel circuit of the capacitor 37 and the transistor 29 for charging of the capacitor 37 until a predetermined level is obtained at which time the voltage on the emitter electrode 32 fires the unijunction transistor 29 and discharges the capacitor 37 through the transistor 29 and the resistor 35. The variable resistor 36 provides a phase adjustment control for setting the time in each half cycle at which the charge of the capacitor 37 rises to a triggering level and thus in effect establishes an output pulse across the resistor 35 in accordance with any predetermined position in the half cycle of the alternating current potential source 1. The output of the generator 17 is connected simutlaneously to the "AND" logic circuits 16 and 16' for the respective silicon control rectifiers 3 and 4.

The "AND" logic circuit 16 includes three "NOR" circuits 39, 40 and 41 connected with circuits 39 and 40 constituting a pair of inputs to the circuit 41. A "NOR" circuit provides an output signal in the absence of an input signal and is driven to zero output in the presence of an input signal. Thus, the "NOR" circuit 41 establishes a signal to fire silicon control rectifier 3 only when both of hteinput "NOR" circuits 39 and 40 have a zero output.

A pulsing transformer 42 couples the output of circuit 41 to the associated silicon control rectifier 3. Transformer 42 includes a primary 43 connected to the output of the "NOR" circuit 41 and a secondary 44 connected between the gate electrode 15 and the cathode electrode 14 of the silicon control rectifier 3.

The corresponding pulsing transformer 42' for the the silicon control rectifier 4 is similarly connected to control the firing of the silicon control rectifier 4.

The firing of the silicon control rectifier 3 is thus dependent upon the output from the "NOR" circuit 41 which in turn is dependent upon the driving of each of the "NOR" circuits 39 and 40 to a zero output. This in turn is controlled by a pulse from the generator 17 and a pulse from the generator 18.

The pulses from generator 17 as previously described are generated in synchronism with the alternating current source 1.

The pulse generator 18 provides a controlled pulse signal as follows. The illustrated pulse generator 18 is a flip-flop circuit including a pair of "NOR" circuits 45 and 46, each having a first input terminal 47 and 48 connected to transformer 19 and a second input terminal 49 and 50 cross connected to the output terminals 51 and 52 of the opposite circuits 46 and 45. The "NOR" circuits 45 and 46 establish an output only when both of the corresponding input terminals have zero input signal.

Transformer 19 includes a primary 53 connected directly in parallel with the welding transformer 2 for energization each time the welding transformer 2 is energized. It further includes a center tapped secondary 54 having a common return center tap 55. A diode 56 connects one side of secondary 54 to the first input terminal 47 of the "NOR" circuit 45 and a diode 57 connects the opposite sides of the secondary 54 to the "NOR" circuit 46.

The output of circuit 45 is connected to timer 20 and the output of circuit 46 is connected to timer 20'. As a result of the cross connection of the output terminals 51 and 52 of circuits 46 and 45 to the input terminals 49 and 50, only one of the circuits 45 and 46 can conduct at any given time for conditioning of the corresponding circuit 16 and 16'.

The operation of the circuit shown in FIG. 1 is more fully summarized as follows. When power is first applied to the complete circuit, the silicon control rectifiers 3 and 4 block the current flow to the welding transformer 2. One of the "NOR" circuits 45 and 46 of the flip-flop circuit or generator 18 establishes an output signal depending upon the difference in the characteristics of the elements therein. It is assumed the circuit 45 establishes the first output signal. This signal is fed to the input terminal 50 of circuit 46 and holds it in the off condition. The signal is also fed to the timer 20 which begins to time out for transmitting of a signal into the "NOR" circuit 40 of the "AND" logic circuit 16. All during the timing period, the pulse generator 17 continues to generate a pulse for each half cycle of the power of the alternating current source 1, which signals are impressed on the circuits 39 and 39' of the "AND" logic circuits 16 and 16'. Each pulse drives circuit 39 to cut off and establishes a zero output from circuit 39 and therefore a zero input signal to the corresponding input to circuit 41. After a predetermined time, the timer 20 times out and transmits a signal to the "NOR" circuit 40 of the "AND" logic circuit 16. Consequently, when the next pulse from the pulse generator 17 is fed to the "NOR" circuit 39, both the circuits 39 and 40 have a zero output. The "NOR" circuit 41 then has no input signal biasing it to cut off and it immediately establishes an output signal which increases to a maximum amplitude. The changing current of the output signal flowing through the primary 43 of the pulsing transformer 42 induces a pulse signal in the secondary 44. This pulse signal is applied to the gate electrode 15 of the silicon control rectifier 3 and causes it to fire during that half cycle providing a positive pulse of current to the welding transformer 2. This also results in a pulse signal being fed back via the feedback transformer 19 to the "NOR" circuit 45 of the generator 18. As a result, the circuit 45 will be driven to zero which in turn removes signal from the other "NOR" circuit 46. The diode 57 prevents establishment of a signal at the second input of the "NOR" circuit 46 and as a result, a zero input appears at both the inputs of the circuit 46. As a result, an output signal is now established at the output terminal 51 of circuit 46. This output signal is fed to input terminal 49 of "NOR" circuit 45 and holds it cut off. Simultaneously, the signal is fed to the timer 20' which begins to time out in the same manner as timer 20 had. After a predetermined time, timer 20' feeds a signal to the "NOR" circuit 40' which causes it to be driven to cut off and establish a zero signal on the connected input terminal to circuit 41'. When the next pulse from the pulse generator 17 is established at "NOR" circuit 39', both inputs to the "NOR" circuit 41' are at zero and an output signal is transmitted from the latter circuit. This is fed via the pulsing transformer 42' to fire the silicon control rectifier 4 and establish a current pulse of high amperage in the opposite direction to the welding transformer 2 and thus through electrodes 5 and for establishing a second spot weld. A reverse polarity signal is also fed back by the feedback transformer 19 which reverses the condition of the "NOR" circuits 45 and 46 of the generator 18 and returns the circuit to the previous condition for triggering of the silicon control rectifier 3.

The exact time during each half cycle of the current from source 1 at which the silicon control rectifiers 3 or 4 is fired is determined by the setting of the timing resistor 36 in the circuit 17. Thus, this resistor 36 determines when in the cycle an output pulse is transmitted to the logic circuits 16 and 16' which in turn provide for corresponding firing during the power cycle. This, in turn, determines the power in the pulse fed to the welding electrodes 5 and 6 and thus the power provided for welding.

Further, the timers 20 and 20' control the effectiveness of trigger pulses from generator 17. If the timers 20 and 20' are delayed in excess of one or more of the pulses from the generator 17, the transformer 2 is operatively disconnected for the corresponding period. It has been found that an electronic timing circuit, such as hereinafter described, will allow separation of the alternate half cycles by as much as 210 seconds times the frequency of the power source.

The output or welding pulses of the system are diagrammatically shown in FIG. 2 and include three time spaced pulses 58, 59 and 60. Pulses 58 and 60 are shown formed by a positive half cycle and the intermediate pulse formed by an intermediate negative half cycle of the main power source 1 at the period a firing pulse is to be applied to the silicon controlled rectifiers 3 and 4. The similar dashed vertical lines 61 within each pulse indicates a selected firing time during which the appropriate silicon controlled rectifiers 3 and 4 fire. These firing points can be set as desired to provide proper welding pulses by setting of the variable resistor 36 in pulse generator 17. The time between the alternate pulses 58–60 is also adjustable as previously noted by proper selection or setting of the timers 20 and 20'. Thus, pulses 58 and 59 are shown spaced by approximately eight half cycles while pulses 59 and 60 are spaced by approximately only four half cycles. This is produced by setting of timer 20' to half the timing period of timer 20. Timers 20 and 20' will normally be similarly set to provide similar time spacing of the alternate pulses 58–60; the illustration of FIG. 2 being given to clearly illustrate the circuit functioning and versatility of the circuit.

This circuit is useful and provides unusually satisfactory results for high amperage, short duration pulses separated by a plurality of half cycles. Thus, spot welding may advantageously employ 1000 ampere pulses for a quarter of a millisecond with alternate pulses separated by four cycles such that each rectifier is fired every eight cycles. The silicon controlled rectifier could be selected with substantially lesser amperage rating as such are generally based on a continuous repetitive firing in each half cycle of the main supply. However, firing during each half cycle may be provided for high speed welding by proper component selection.

Further, by proper selection of a source and transformer 11 and 19, the transformer 22 may be eliminated. Transformer 22 is basically used to provide a proper output voltage while employing generally standard, commercially available components in the welding circuit. The advantage in eliminating transformer 22 would be an increase in rate of current increase on firing; i.e. a faster rise time.

As previously mentioned, the "NOR" circuits shown in FIG. 1 may be any known or suitable device. A satisfactory "NOR" circuit is shown in FIG. 3 including a transistor 62 having a collector electrode 63 and an emitter electrode 64 and a base electrode 65. A first biasing battery 66 is connected between the collector electrode 63 and the emitter electrode 63 in series with a bias control resistor 67. A similar bias battery 68 is shown connected in series with a bias resistor 69 between the base 65 and the emitter 64 to provide the conventional common emitter configuration. The batteries 66 and 68 will maintain proper bias on the transistor to establish an output signal to a load 70 shown in block diagram in FIG. 3, in the absence of an input signal at the base electrode 65. A pair of input resistors 72 and 73 are shown connected in parallel to the base 65 for providing individual input signals to the base. In the circuits of FIG. 1 where a single input is shown into a "NOR" circuit, only one of the resistors 71 or 72 is employed whereas wherever a pair of inputs is employed, both of the resistors 71 and 72 are employed one for each of the outputs. The load 70 is shown in block diagram in FIG. 3 as it is the primary 43 of the pulsing transformer 42 for the output "NOR" circuit 41 and an input resistor of a subsequent "NOR" circuit or timer in the other circuits shown.

A suitable timing circuit is shown in FIG. 4 including a flip-flop output circuit formed by a pair of "NOR" circuits 73 and 74 generally interconnected as are circuits 45 and 46 in generator 18.

A pair of series connected "NOR" circuits 75 and 76 is connected with one end as the input terminal of the timer. The junction 77 of circuits 75 and 76 is connected to an input of circuit 73. A variable resistor 78 in series with a diode 79 connects circuit 76 to one input of circuit 74. A capacitor 80 is connected between the junction of resistor 78 and diode 79. The variable resistor 79 and capacitor 80 make a timing circuit whereby an input signal to the timer 20 does not create an output until after a predetermined time depending upon the setting of the resistor 78 and the value of capacitor 80. Once the circuit times out, it maintains an output until such time as the input signal is compleely removed. Timing is accomplished as a result of the time taken for the current to rise from zero through the resistor 78 and the capacitor 80 in a well known manner.

The circuits of FIGS. 3 and 4 are given for illustrative purposes to more clearly illustrate the operation of the circuits shown in FIG. 1.

The individual welds may be spaced by changing the speed of the electrodes or by changing the actual spacing of the welding pulses by skipping one or more of the alternate pulses of the power supply.

The present invention is particularly adapted for a seam welding system employing continuous spot welds each of which is formed during a half cycle pulse from the high frequency generator. For example, a 1000 cycle generator provides 2000 pulses per second and thus permits formation of 2000 small spot welds per second. This would permit a welding speed of approximately 15,000 inches per minute with a continuous seam weld being formed. Because of the speed of the wave fronts with a high frequency current, the control units must presently be of a solid state device such as the silicon control rectifier in order to permit the rapid firing and recovery of the devices.

The present invention thus provides a high frequency pulse generating system for resistance or other welding applications and particularly for high speed production seam welding of thin metal members and the like. The invention also provides means for controlling the power of each pulse by the simple means of controlling the phase at which the silicon control rectifiers are fired in combination with the additional timer control means for controlling which of the cycles of the alternating current source are effective to operate or to provide an output welding current.

In summary, the present invention provides a simple, efficient and accurate seam welding device which can provide very high production when welding thin elements and the like without deformation of the work members.

Various modes of carrying out the invention are contemplated as being within the scope of the following claims particularly pointing out and distinctly claiming the subject matter which is regarded as the invention.

I claim:

1. A welding circuit for establishing welding current pulses to electrode means, comprising,
    (a) an alternating current source having an output circuit with terminal means for connection to said electrode means for supplying current to the electrode means,
    (b) a pair of parallel control circuits connected in the output circuit, said control circuits including switching means to control conduction therethrough, said switching means having a triggering means for operatively closing thereof,
    (c) first control means to establish a train of triggering pulses in synchronism with the half cycles of the current from the current source said first control means including an adjustable timing means to vary the time in each half cycle that the trigger pulse is established,
    (d) second control means to establish a second train of pulses in accordance with the triggering of said switching means, and
    (e) logic circuit means having a pair of input means with one connected to said first control means and the other connected to said second control means and establishing an output signal at an output means upon coincident pulses from said first and second control means, said output means being connected to said switching means to alternately trigger said switching means.

2. A welding circuit for establishing welding current pulses to electrode means, comprising,
    (a) an alternating current source for supplying welding current to the electrode means,
    (b) a pair of paralleled and reverse biased silicon controlled rectifiers connected to the source and having terminal means for connection to the electrode means and each having a gate electrode to control firing thereof,
    (c) first control means to establish a train of triggering pulses in synchronism with the current from the current source said first control means including an adjustable timing means to vary the time in each half-cycle that the trigger pulse is established,
    (d) second control means to establish a second train of pulses in accordance with the firing of said rectifiers, and
    (e) logic circuit means having a pair of input means with one connected to said first control means and the other connected to said second control means and establishing an output signal at an output means upon coincident pulses from said first and second control means, said output means being connected to said switching means to alternately fire said silicon control rectifiers.

3. The circuit of claim 2 wherein,
(a) said last named means includes a pair of "AND" logic circuits having said control means connected thereto and the outputs connected to control the respective silicon control rectifiers, and
(b) a timing means connected between the second control means and the logic circuits to determine the time between the firing of the rectifiers.

4. The circuit of claim 3 wherein,
(a) said timing means is adjustable to vary the timing period and thereby vary the firing time of the rectifiers.

5. A circuit for supplying welding current pulses to resistance welding electrodes, comprising,
(a) a source of alternating current having an output frequency in excess of 1000 cycles per second,
(b) means for connecting said source to the welding electrodes and including a pair of parallel rectifying devices connected with opposite polarity with respect to the source and each having gate control means,
(c) first control means to establish a train of triggering pulses in synchronism with the half cycles of the current from the current source said first control means including an adjustable timing means to vary the time in each half cycle that the trigger pulse is established,
(d) second control means to establish a second train of pulses in accordance with the triggering of said rectifying devices, and
(e) logic circuit means having a pair of input means with one connected to said first control means and the other connected to said second control means and establishing an output signal at an output means upon coincident pulses from said first and second control means, said output means being connected to said rectifying devices to alternately trigger said rectifying devices.

6. The circuit of claim 5 wherein,
(a) said last named means includes a pair of "AND" logic circuits having said control means connected thereto and the outputs connected to control the respective rectifying devices, and
(b) a timing means connected between the second control means and the "AND" logic circuits to determine the time between the firing of the rectifiers.

7. A welding circuit for supplying short duration pulses through a pair of spaced resistance welding wheels, which comprises,
(a) a source of alternating current having an output frequency in excess of 1000 cycles per second,
(b) a first silicon controlled rectifier connected in series with the source and having a gate,
(c) a second silicon controlled rectifier connected in parallel with the first silicon controlled rectifier with reverse polarity and having a gate,
(d) a pair of logic circuits each having two inputs and an output,
(e) pulse transformers connecting the outputs to the gates of the rectifiers,
(f) a first pulse generator connected to the source and generating an output pulse each half cycle of source current, said pulse generator being connected to one input of each logic circuit,
(g) a second pulse generator having a pair of outputs connected one each to the second input of the logic circuits,
(h) timing circuits connected between the second pulse generator and each input of the logic circuits, and
(i) means connected to the rectifiers and responsive to conduction of one of said rectifiers to actuate said second pulse generator to transmit a pulse signal to the logic circuit associated with the other of said rectifiers.

8. The welding circuit of claim 7 wherein,
(a) said first pulse generator includes a unijunction transistor having a control capacitor and a phase control resistor connected to the source to generate a pulse each half cycle of the alternating current from the source, the pulse being formed in the cycle in accordance with the setting of the resistor, and
(b) said logic circuits being biased to conduct by a signal from the second generator and conducting in response to simultaneous application of the pulse from the pulse generator to fire the corresponding rectifier in essential time correspondence with said pulse generator whereby the power in welding pulses is controlled.

9. A welding circuit for supplying short duration pulses through a pair of spaced resistance welding wheels, which comprises
(a) a source of alternating current having an output frequency in excess of 1000 cycles per second,
(b) a welding transformer,
(c) a first silicon controlled rectifier connected in series with the source and the transformer and having a gate,
(d) a second silicon controlled rectifier connected in parallel with the first silicon controlled rectifier with reverse polarity and having a gate,
(e) a first "AND" logic circuit including an output "NOR" circuit and a pair of input "NOR" circuits,
(f) a first pulse transformer connecting the output "NOR" circuit to the gate of the first rectifier,
(g) a second "AND" logic circuit including an output "NOR" circuit and a pair of input "NOR" circuits,
(h) a second pulse transformer connecting the second output "NOR" circuit to the gate of the second rectifier,
(i) a pulse forming circuit connected to the source and generating an output pulse each half cycle of source current and having means to adjust the phase in each half cycle at which the pulse is formed,
(j) means connecting the output pulse to one of each of the pair of input "NOR" circuits of the "AND" logic circuits,
(k) a flip-flop circuit having two "NOR" circuits each having a pair of input terminals and an output terminal, said output terminal being connected to one input terminal of the opposite "NOR" circuit,
(l) a pair of timing circuits one each connecting the outputs of the flip-flop circuit to the other of the input "NOR" circuits of the "AND" logic circuits, and
(m) a feedback transformer connected to the source in parallel with the welding transformer and connected to the other input terminals of the flip-flop circuit and connected to reverse the states thereof in response to establishment of a welding pulse.

10. The welding circuit of claim 9 wherein,
(a) each of said "NOR" circuits includes a transistor biased to conduct and establish an output and a plurality input means for biasing the transistor to cut off.

References Cited

UNITED STATES PATENTS 2,931,885   4/1960   Underwood et al. __ 219—102 X
3,233,116   2/1966   Watrous _____ 219—114 X
3,251,000   4/1966   Suel _____ 219—114 X RICHARD M. WOOD, *Primary Examiner.*

J. G. SMITH, *Assistant Examiner.*